United States Patent Office 3,364,276
Patented Jan. 16, 1968

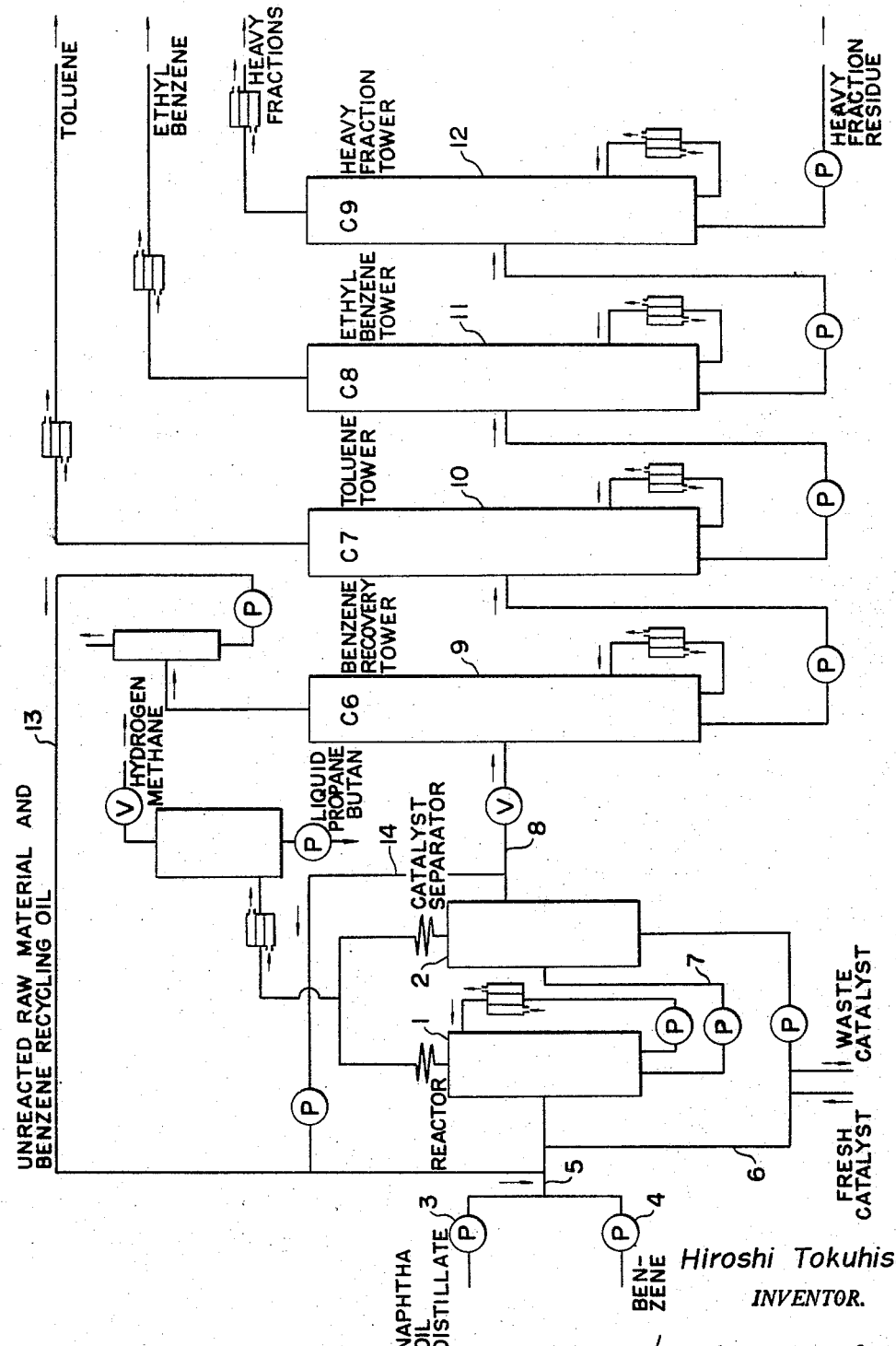

3,364,276
METHOD FOR MANUFACTURING ETHYL BENZENE
Hiroshi Tokuhisa, 4–203, Kadan-Apart, 75, Biwakubi-cho, Miyagi-ken, Sendai-shi, Japan
Filed Jan. 22, 1965, Ser. No. 427,260
Claims priority, application Japan, Jan. 24, 1964, 39/3,270
6 Claims. (Cl. 260—671)

ABSTRACT OF THE DISCLOSURE

There is provided a process for producing, principally, ethyl benzene from a petroleum distillate containing paraffin and/or naphthene without the objectionable formation of xylene. The distillate is reacted with an excess amount of benzene in the presence of a known alkylation catalyst at a temperature ranging from 100° C. to 300° C. for a length of time ranging from 1 to 200 minutes.

Specification

The present invention relates to a process for producing ethyl benzene. More particularly, this invention relates to a method for obtaining ethyl benzene by distilling same from a reaction product which is substantially composed of ethyl benzene. The aforesaid reaction product is formed by reacting benzene with a hydrocarbon fraction composed of paraffin and naphthene in the presence of an alkylation catalyst. The amount of benzene which is added to the aforesaid hydrocarbon fraction, which is most suitably a petroleum distillate, is in excess of the amount necessary for the formation of ethyl benzene. The preferred oil distillate is naphtha reformate. As is well known, naphtha reformate is naphtha which has been dehydrogenated and cyclized in the presence of a catalyst (e.g. the oxides of chromium, vanadium, and molybdenum carried on an alumina support) at high pressures and temperatures.

Ethyl benzene may be contained in considerable quantity in such materials as naphtha reformate; however, it is very difficult to separate it, particularly on a commercial basis, because the reformate contains distillates such as a xylene fraction which has a boiling point very close to that of ethyl benzene. Therefore, ethyl benzene is usually commercially produced from pure benzene and ethylene. For example, by the direct reaction, in an alkylation apparatus, of benzene obtained by separating benzene by an extracting method, such as, the Udex process from hydrogenated bottom fraction produced in naphtha cracking or from reformate such as platformate, and purified ethylene obtained from naphtha cracking gas. Thus, ethyl benzene is an expensive product because of the complicated commercial process used to produce it.

Ethyl benzene has lately become very important as an industrial raw material; for example ethyl benzene is converted to styrene, which is a raw material for plastics, by dehydrogenation. In view of this new use for ethyl benzene, and many others, the high cost of producing ethyl benzene is becoming an increasing problem. The present invention is directed to alleviating this problem.

It is known to produce ethyl benzene by the reaction of benzene with paraffins in the presence of an alkylation catalyst such as aluminum chloride (with hydrochloric acid). Further, it is known that ethyl benzene may be produced by the reaction of benzene and naphthene in the presence of an alkylation catalyst. In these reactions, however, many alkylated substances other than ethyl benzene are simultaneously produced. For example, xylenes which have a boiling point close to that of ethyl benzene. It is, therefore, impossible to commercially manufacture ethyl benzene in this manner.

The reaction of benzene with paraffin or naphthenes produces a mixture of toluene, ethyl benzene, gas and other products.

We have discovered that toluene is converted in this reaction to benzene and xylene by the following reaction:

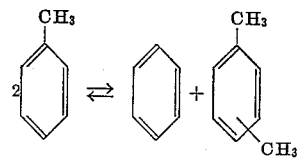

Such a reaction is reversible and when a large amount of benzene exists in the mixture, the reaction is reversed. Toluene concentration then becomes larger, whereas the xylene concentration is greatly reduced. Accordingly, if the concentration of benzene in the system is greater than toluene, it is possible to restrict xylene formation and thereby separate ethyl benzene by distillation.

It is clear from the foregoing that by the use of the term "an excess of benzene," is meant that the amount of benzene is in excess of that amount which reacts to form ethyl benzene. That is, it is necessary that a sufficient amount of benzene is used so that after the formation of ethyl benzene some is left in the mixture over and above that amount which is produced from toluene.

The present invention has the following objects:

(1) The embodiment of a method for easily obtaining ethyl benzene by distillation by producing ethyl benzene as the only eight carbon aromatic hydrocarbon from the reaction between paraffin and naphthene contained in a petroleum distillate and an excess amount of benzene.

(2) To reduce the cost of ethyl benzene by simplifying the process.

(3) To manufacture ethyl benzene from such crude raw materials as oil distillate and reformate.

All types of petroleum distillates, especially reformate containing paraffins and naphthenes as well as benzene, are suitable for industrial raw materials for use in this invention. When reformate is used as the raw material, it is only necessary to add enough benzene to prevent formation of xylene which can then be recycled. Any alkylation catalyst may be used so long as it is capable of forming ethyl benzene from benzene and ethylene: for instance, Friedel-Craft type catalysts such as aluminum chloride with hydrochloric acid (which is the prefered catalyst of this invention) or acidic catalysts such as aluminum chloride, boron trifluoride, aluminum bromide, sulfuric acid, and phosphoric acid.

Generally speaking, the reaction is conducted at a temperature ranging from 100 to 300° C., preferably from 120 to 250° C. While the amount of catalyst varies slightly with the process to be used, batch or continuous, the molar ratio of catalyst to raw material oil should be at least more than 0.01, preferably 0.01–2, and for a continuous reaction, it is suitable that, for example, the molar ratio of catalyst to raw material be about 1 in the reaction system. The pressure is not particularly critical, the preferred range being from 1 atmosphere to 50 atmospheres.

When it is necessary, as for example in a continuous system, to add new raw material, the molar ratio of catalyst to raw material oil should be about 0.01. Increasing the amount of catalyst is similar to increasing the temperature in that the reaction velocity is accelerated. But if the increase is too great side reactions occur such as an increase in the bottom fraction because of polymerization. Excessive prolongation of reaction time (the preferred reaction time being about 1 to 200 minutes) gives similar results.

Referring now to the drawing which illustrates a continuous reaction.

In the drawing, 1 is a reactor and 2 is catalyst separator. To the reactor 1, raw material such as naphtha (for example, oil distillate having final boiling point of below 110° C.) is fed by pump 3 and benzene by pump 4, both through piping 5. The reactor is maintained, for example, at a temperature of about 150° C. and under a pressure of about 10 atm. The feed, after mixing with the catalyst slurry fed from the catalyst feeding pipe 6 connected with the piping 5 (piping 6 can be directly connected with the reactor if desired), is sent through piping 5 to the reactor at a flow rate such that the reactants remain in the reactor for 15 minutes on an average (i.e., the average reaction time is 15 minutes). From the top of the reactor, hydrogen and methane, which are produced from the reaction, are discharged, and from the reaction chamber a mixture of reactant and catalyst is withdrawn and sent through piping 7 to about the middle of the catalyst separator 2. The reactor is equipped to inhibit the separation of catalyst from raw material, to make their contact better, and to maintain the reaction temperature by using circulation through a heater. The catalyst separator is a type of static separator and the mixture of reactant and catalyst is separated into layers such as a by-product gas layer, a liquid layer containing no catalyst and a concentrated catalyst slurry layer, each of which is withdrawn from the top, upper part and bottom of the vessel respectively. The catalyst slurry extracted from the bottom is mostly recycled to the reactor, while it is partly (for example, about 0.1 molar ratio) discharged and fresh catalyst of the same amount as discharged is supplied. Thus, in this method the mole ratio of catalyst to raw material (naphtha) can be raised to about 1, because the catalyst can be reused by recycling it. It is therefore possible to keep the reaction rate at a high level.

The hydro-carbon phase separated from the catalyst is withdrawn from the separator 2 and sent to benzene recovery tower 9, toluene tower 10, ethyl benzene tower 11 and heavy fraction tower 12 to separate the product into the desired fractions. As shown in the drawing, these devices are divided into four towers for convenience; however, the towers can be added or reduced according to the circumstances. Benezene and unreacted raw material vapor which remain, from the top of the benzene tower, after removing low boiling point gas fraction in the mixture, are recycled to the reactor through piping 13. Accordingly, if benzene in the raw material naphtha corresponds, for example, to the amount of benzene consumed in the reaction, benzene in excess initially fed by pump 4 (for instance three times as much as in raw material) recycles in its original quantity. Therefore, it is not necessary to supply any substantial amount of benzene during the operation and even if there is not enough benzene in the raw material, it should be sufficient to supply only the shortage during the operation. Piping 14 is a reactant recycle conduit. In the present invention ethyl benzene from the ethyl benzene tower is commercially pure, i.e., it contains neither xylene nor any other compounds having substantially the same boiling point as ethyl benzene.

The following examples are directed to the batch process of this invention and are exemplary embodiments only and are not to be construed as limiting the invention.

Example 1

Reaction was conducted in an autoclave under the following conditions using light naphtha fraction having the following properties and benzene as raw materials:

Properties of raw material oil:

| | |
|---|---|
| Specific gravity (20/4° C.) | 0.7105 |
| Initial boiling point (°C.) | 36 |
| 50% point (°C.) | 75 |
| Final boiling point (°C.) | 101 |
| Paraffins (vol. percent) | 53.8 |
| Naphthenes (vol. percent) | 46.2 |
| Olefines (vol. percent) | None |
| Aromatics (vol. percent) | None |

Reaction conditions:

| | |
|---|---|
| Benzene/naphtha molar ratio | 3 |
| Aluminum chloride/raw material oil molar ratio (with hydrochloric acid) | 0.04 |
| Reaction temperature (°C.) | 180 |
| Reaction time (minutes) | 15 |

The reaction product is composed of liquid substance and its gaseous part is only 0.85 mole percent to raw material. The composition thereof is as follows.

Liquid product (weight percent):

| | |
|---|---|
| Raw material oil fraction (unreacted) | 95.4 |
| Toluene | 0.7 |
| Ethyl benzene | 2.5 |
| Xylene | Trace |
| Others | 1.4 |

Gaseous product (mole percent):

| | |
|---|---|
| Hydrogen | 88 |
| Methane | 2 |
| Ethane | Trace |
| Propane | 4 |
| Butane | 5 |
| Pentane | 1 |

This example, though the reaction rate is low, shows clearly that the presence of paraffins as well as naphthenes in the feed does not interfere with formation of ethyl benzene, that with a large quantity of benzene very little xylene is formed.

Example 2

Products resulting from the reaction made with same raw materials and under the same conditions as in Example 1, except for a temperature of 200° C. and a reaction time of 30 minutes, are as follows.

Liquid product (weight percent):

| | |
|---|---|
| Raw material oil fraction | 90.1 |
| Toluene | 2.2 |
| Ethyl benezene | 5.1 |
| Xylenes | trace |
| Others | 2.6 |

*Gaseous product.*—Quantity of gas generated is 1.2 mole percent to the raw material and composition of the gas is the same as in Example 1.

In this example, the reaction is exactly the same as in the above example and shows the fact that a rise in reaction temperature and an increase in reaction time raise the reaction rate.

Example 3

Under the same conditions as in Example 2, except that the molar ratio of aluminum chloride to raw material oil is 1 and the reaction temperature is 220° C., and with same raw material, the reaction gave the following results.

Liquid product (weight percent):

| | |
|---|---|
| Raw material oil fraction | 68.2 |
| Toluene | 9.5 |
| Ethyl benzene | 15.8 |
| Xylenes | trace |
| Others | 6.5 |

*Gaseous product.*—Quantity of gas generated is 2.0 mole percent based on the raw material oil and its composition is the same as in above two examples. The example shows that as catalyst increases in quantity, the reaction improves rapidly.

It is thought that the invention and its advantages will easily be understood from the foregoing description and it is apparent that various changes may be made without departing from the spirit and scope of the invention or sacrificing its material advantages, the processes hereinbefore described being merely illustrative of preferred embodiments of the invention.

Having thus disclosed the invention, what is claimed is:

1. Method for producing ethyl benzene which comprises reacting an excess of benzene with a petroleum distillate containing at least one member of the group consisting of paraffin and naphthene in the presence of an alkylation catalyst, while maintaining a molar excess of benzene with respect to toluene in the reactive mixture thereby obtaining a reaction product containing substantially only ethyl benzene as the aromatic hydrocarbon having eight carbon atoms, and distilling the ethyl benzene from said reaction product.

2. Method according to claim 1 wherein the alkylation catalyst is selected from the group consisting of aluminum chloride, boron trifluoride, aluminum bromide, and phosphoric acid.

3. Method for producing ethyl benzene which comprises reacting an excess amount of benzene with naphtha reformate in the presence of aluminum chloride-hydrochloric acid catalyst at a temperature of from 100° to 300° C., while maintaining a molar excess of benzene with respect to toluene in the reactive mixture thereby obtaining a reaction product containing substantially only ethyl benzene as the aromatic hydrocarbon having eight carbon atoms, and distilling the ethyl benzene from said reaction product.

4. Method according to claim 3 wherein the molar ratio of catalyst to naphtha reformate is from 0.01 to 2.

5. Method according to claim 3 wherein the reaction time is about 1 to 200 minutes.

6. Method according to claim 3 wherein the reaction is conducted at a pressure of from 1 atmosphere to 50 atmospheres.

References Cited
UNITED STATES PATENTS

| | | | |
|---|---|---|---|
| 2,104,424 | 1/1938 | Ipatieff et al. | 260—671 |
| 2,234,984 | 3/1941 | Sachanen et al. | 260—671 |
| 2,385,524 | 9/1945 | Mattox | 260—672 |
| 2,396,965 | 3/1946 | Passino | 360—671 |
| 2,404,591 | 6/1946 | Naragon | 260—668 |
| 2,416,184 | 2/1947 | Lee et al. | 260—671 |
| 2,532,276 | 12/1950 | Birch et al. | 260—668 |

DELBERT E. GANTZ, *Primary Examiner.*

C. R. DAVIS, *Assistant Examiner.*